Jan. 23, 1962 F. G. WILLARD ETAL 3,017,984
WORKPIECE POSITION CONTROL APPARATUS
Filed July 13, 1959 5 Sheets-Sheet 1

WITNESSES
Edwin E. Basler
James F. Young

INVENTORS
Frank G. Willard &
Eugene P. Ross
BY R.W. Brodahl
ATTORNEY

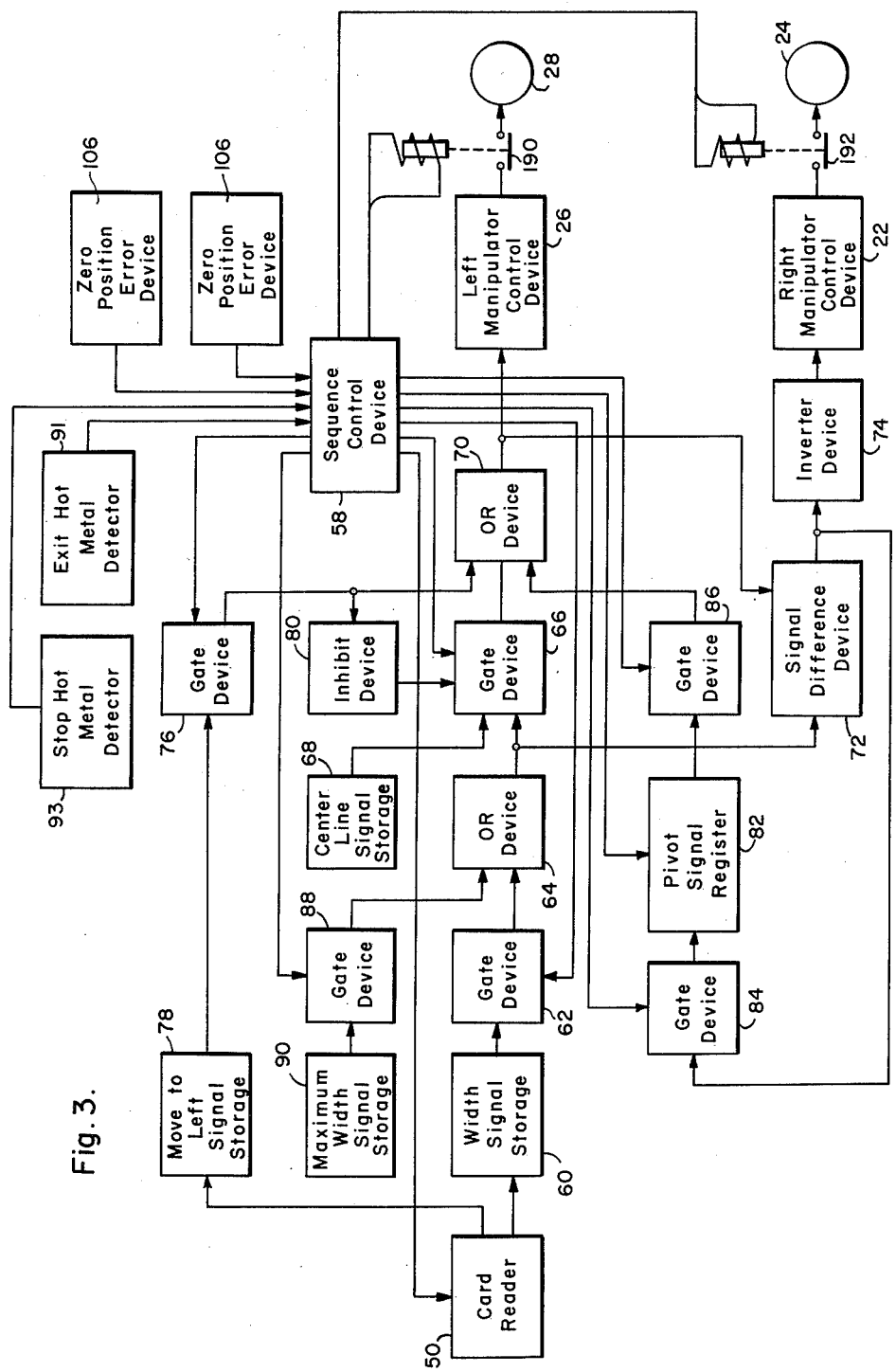

Jan. 23, 1962 F. G. WILLARD ETAL 3,017,984
WORKPIECE POSITION CONTROL APPARATUS
Filed July 13, 1959 5 Sheets-Sheet 3

3,017,984
Patented Jan. 23, 1962

3,017,984
WORKPIECE POSITION CONTROL APPARATUS

Frank G. Willard, Clarence, and Eugene P. Ross, Tonawanda Township, Erie County, N.Y., assignors to Westinghouse Electric Corporation, East Pittsburgh, Pa., a corporation of Pennsylvania
Filed July 13, 1959, Ser. No. 826,776
15 Claims. (Cl. 198—29)

The present invention relates in general to workpiece position control apparatus and, more particularly, to automatic control apparatus for positioning a workpiece such as a metal billet member and operative with a steel rolling mill.

It is an object of the present invention to provide improved workpiece positioning apparatus operative to automatically and better control the positioning of a workpiece, such as a steel mill billet member, through a predetermined and sequenced program of different workpiece positions.

It is another object of the present invention to provide improved workpiece control apparatus wherein the workpiece is positioned in accordance with a predetermined program of positions, including predetermined workpiece positions and a predetermined scheduling of those positions.

It is a different object of the present invention to provide improved workpiece positioning control apparatus operative to provide a predetermined initial spacing between first and second workpiece control members, and then subsequently to provide a predetermined different spacing between the workpiece position control members relative to the workpiece to be positioned.

It is an additional object of the present invention to provide improved workpiece positioning control apparatus operative to automatically and better control the relative spacing as well as the relative positions of a pair of workpiece position control members operative with a workpiece to be positioned.

It is a further object of the present invention to provide improved workpiece positioning control apparatus that is operative in accordance with a predetermined reference for controlling the positioning of the workpiece and is responsive to changes in the dimension of the workpiece to be positioned.

These and other objects and advantages of the present invention will become apparent in view of the following description taken in conjunction with the drawings wherein:

FIG. 3 is a diagrammatic showing of the control apparatus in accordance with the present invention;

Figure 5:
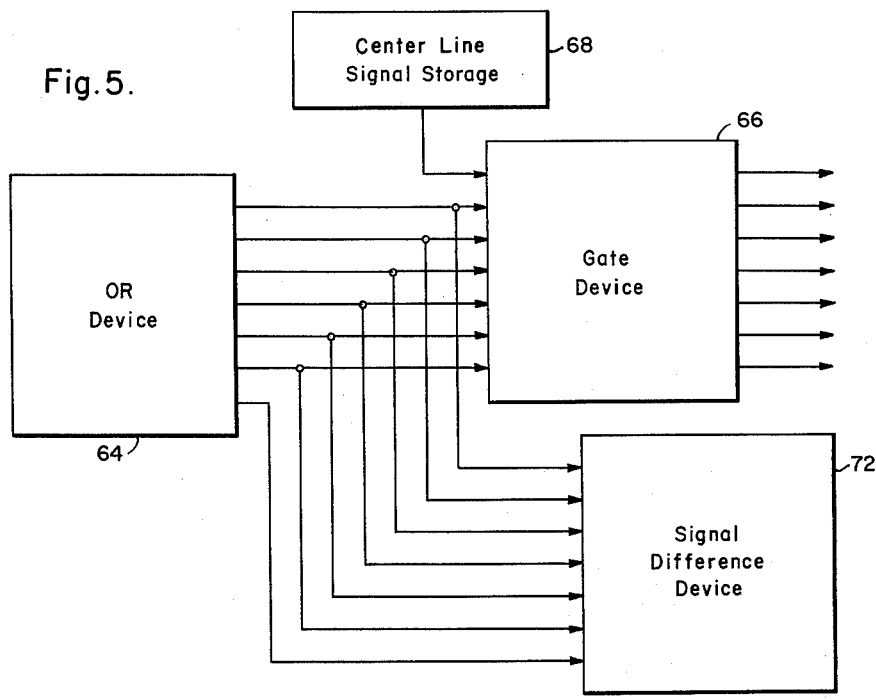
Figure 6:
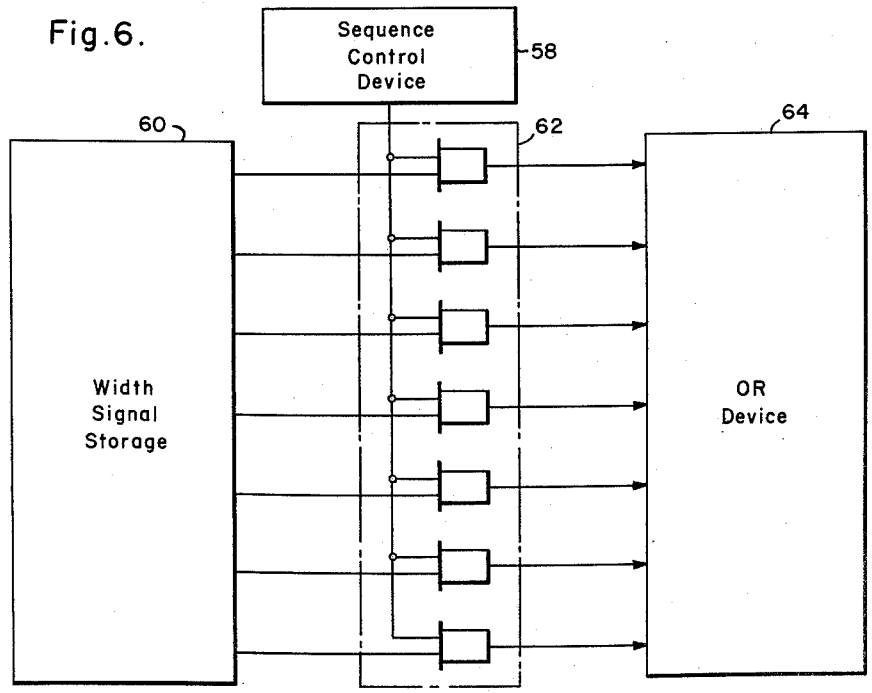
Figure 7:
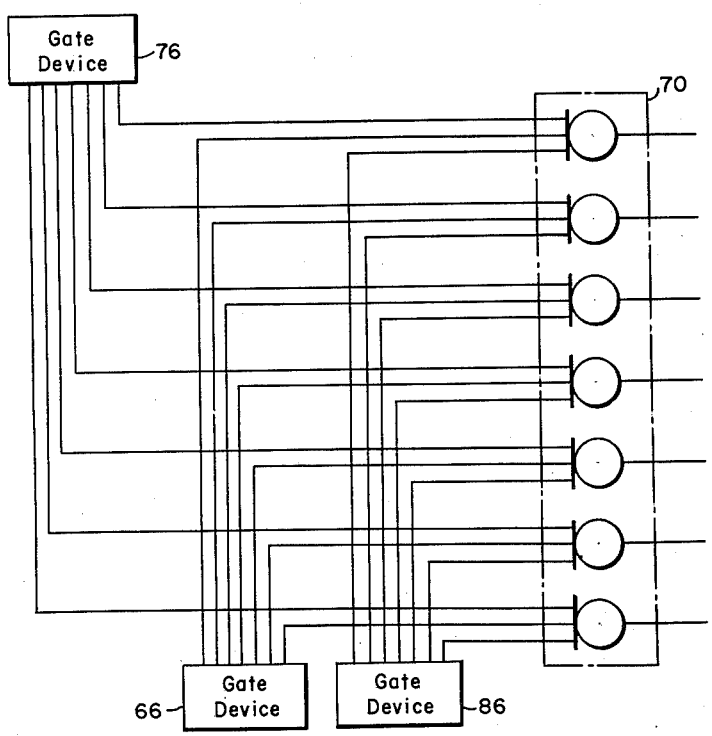
Figure 8:
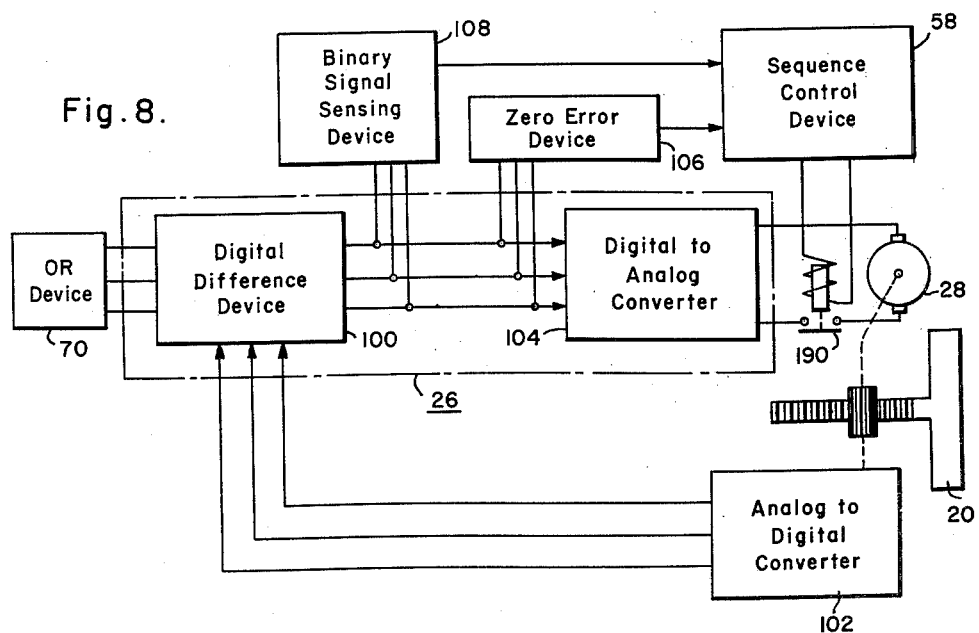

FIGS. 4A, 4B, 4C, 4D and 4E comprise an illustrative showing of the left and right manipulator members as they would be sequentially positioned relative to a workpiece to be positioned thereby;

FIG. 5 is an illustrative showing of the control circuit utilized to provide the output signal for the positioning of a predetermined one of the position control members such that the workpiece is positioned relative to a predetermined center line of the mill stand;

FIG. 6 is a schematic showing of one of the gate members of FIG. 3;

FIG. 7 is a schematic showing of the OR gate shown in FIG. 3 and utilized to provide control information to the left manipulator control; and FIG. 8 is a diagrammatic showing of the left manipulator control device.

Figure 1:
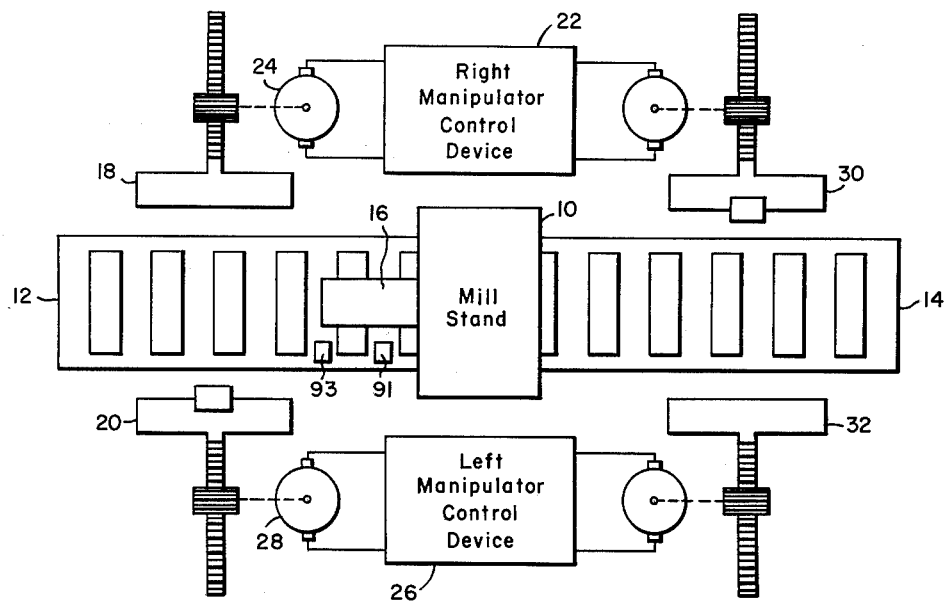
FIGURE 1 is an illustrative showing of the rolling mill including left and right manipulator position control members.

In FIG. 1, there is shown a mill stand 10 including a rear table 12 and a front table 14. A metal workpiece such as a slab or billet member 16 is shown traveling out of the mill stand 10 onto the rear table 12. A right manipulator member 18 and a left manipulator member 20 are operative to move inwardly and position the billet 16 on the rear table 12 prior to and in preparation for reentry of the billet 16 into the mill stand 10. A right manipulator control device 22 is operative with a motor 24 for controlling the movement of the right manipulator member 18 relative to the rear table 12. Similarly, a left manipulator control device 26 is operative with a motor 28 for controlling the movement of the left manipulator member 20 relative to the rear table 12. The front table 14 similarly includes a right manipulator member 30 and a left manipulator member 32 that are respectively operative with the controls 24 and 26.

Figure 2:
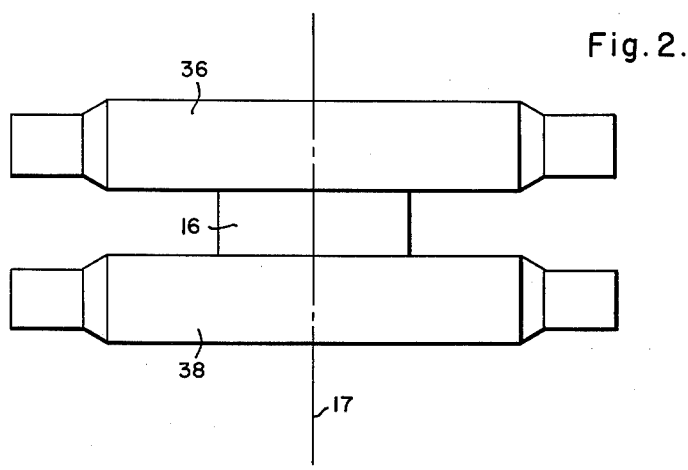
FIG. 2 is an illustrative showing of upper and lower work roll members for the rolling mill shown in FIG. 1.

In FIG. 2, there is shown an upper roller member 36 and a lower roller member 38 operative with the billet member 16 positioned relative to the centerline 17 to illustrate one type of rolling mill, such as the mill stand 10 shown in FIG. 1, for which the present control apparatus is contemplated.

In FIG. 3, there is shown a well known and conventional type of punched card reader device 50 readily available on the open market at the present time. A sequence control device 58, which similarly may be a well known and conventional type of control device such as an asynchronous clock sequence control device is operative to provide sequence controlling signals to the various control devices for controlling the operation of those devices. The card reader device 50 supplies control signals in accordance with the respective widths of the workpiece to be manipulated. More specifically, the initial width signal $SW_0$ and the subsequent width signal $SW_f$ for controlling the respective initial positions $L_0$ and $R_0$ of the left and right manipulators 20 and 18 when the workpiece dimension $W_0$ is between the manipulator members 20 and 18 and the final positions $L_f$ and $R_f$ of the respective manipulator members when the workpiece is positioned such that its dimension $W_f$ is between the manipulator members 20 and 18. The initial width signal $SW_0$ is supplied by the card reader 50 to the width signal storage device 60. This signal passes through the gate 62 and the OR device 64 to a second gate device 66, with the input wiring to the gate device 66 being such as will be subsequently described relative to FIG. 5 to effectively divide by two to provide one-half the signal $SW_0$ received from the OR device 64. A center line distance signal storage device 68 is operative to supply to the gate 66 through a predetermined wiring arrangement a control signal $S_{CL}$ corresponding to the center line position of the mill stand 10 including the roller members 36 and 38. Thusly, the output signal from the gate 66 which we shall designate signal $SL_0$ corresponds to the center line signal $S_{CL}$ plus the initial width signal $SW_0$ divided by two. This control signal $SL_0$ is supplied by the OR device 70 to the left manipulator control device 26.

It should be here noted that the relay member 190 is normally open and is closed by the sequence control device 58 only when it is desired that the left manipulator motor 28 should operate.

This same control signal $SL_0$ from the OR device 70 is supplied to a first or plus input of a signal difference device 72. The second or minus input of the difference device 72 is supplied the control signal $SW_0$ from the OR device 64. The output signal $SR_0$ of the difference device 72 corresponds to the left manipulator position control signal $SL_0$ minus the workpiece width signal $SW_0$. The inverter device 74 is provided to invert the signal $SR_0$ coming from the difference device 72 as will be later explained and supply it to the right manipulator control 22 for the right manipulator motor 24. Here again it should be noted that the relay device 192 is normally open and is closed by the sequence control device 58 only when it is desired that the motor 24 should operate.

The sequence control 58 is operative to control the sequence of operation of the card reader device 50, the gate 62 and the gate 66 for controlling the operation of the card reader device 50 and the openings of the respective gates 62 and 66. When the left and right manipulator members 20 and 18 respectively are in their desired initial positions, $L_0$ and $R_0$, in response to suitable signals from the zero position error devices 106 and 106' the sequence control 58 opens the gate 76 to interrogate or determine whether a move to left control signal has been supplied by the card reader device 50 to the move to left storage device 78. If such a signal has been provided, this move to left signal $SL_1$ which is in accordance with an arbitrary position $L_1$ for the left manipulator member 20 is supplied through the gate 76 and the OR 70 to the left manipulator control 26. The difference device 72 is then operative to subtract from the control signal $SL_1$ the workpiece width signal $SW_0$ to thereby provide a control signal $SR_1$ for the right manipulator control 22. An inhibit device 80 is operative with the output of the gate 76 when the gate 76 is opened by the sequence control device 58 for providing a suitable signal, when the signal $SL_1$ is not provided, for closing the gate 66.

The control signal $SR_1$ is now stored in the pivot register 82 by the sequence control device 58 opening the gate 84. The gate device 86 remains closed at this time such that this control signal $SR_1$ remains in the pivot register 82. The gate device 84 is then closed by the sequence control device 58.

The sequence control device 58 interrogates the width signal storage device 60, after closing the gate device 84, to obtain the control signal $SW_f$. The latter signal $SW_f$ is the width signal for the next pass entry of a workpiece into the rolling mill.

The sequence control device 58 now opens the gate 86 to provide the stored control signal $SR_1$ to the OR device 70 and the left manipulator control 26. It has been arbitrarily predetermined that the position $R_1$ should correspond with the post turn position $L_2$ of the left manipulator control member 20 such that the signal $SR_1$ is also $SL_2$. The control signal $SL_2$ is supplied from the OR device 70 to the plus input of the difference device 72. The new workpiece width signal $SW_f$ is supplied through the gate 62 and the OR device 64 to the subtraction input of the difference device 72 such that an output signal $SR_2$ is provided from the difference device 72 corresponding to the signal $SL_2$ minus $SW_f$. The inverter 74 inverts this control signal and supplies it to the right manipulator control 22.

Now the sequence control device 58 closes each of the relay devices 190 and 192 to cause the respective motors 28 and 24 to move the respective manipulator members 20 and 18 to the positions $R_2$ and $L_2$. However, in this regard it may be desired to close the relay member 192 first without closing the relay member 190 to allow the right manipulator member 18 to begin moving to its position $R_2$. By the provision of a suitable binary signal sensing device 108, similar to the illustration in FIG. 8 of the signal sensing device 108 provided for the left manipulator control, in the output of the right manipulator control 22 or perhaps within the right manipulator control, a control signal is supplied to the sequence control device 58 when the right manipulator 18 is in a position approximately 6 inches or so from its position $R_2$ at which time the relay device 190 is closed and the finger members are caused to move upward such that the billet member 16 turns about its pivot position $R_1$ and falls against the right manipulator member 18 before the right manipulator member 18 is in its position $R_2$. As the right manipulator member 18 moves into its position $R_2$ the billet member 16 slides down the slanted face of the right manipulator member 18 and in this manner cushions the fall of the workpiece 16 onto the work tables. In this regard, it should be noted that the workpiece 16 may be a steel billet member weighing on the order of 10 or 15 tons. After the manipulator members 20 and 18 are in their respective positions $L_2$ and $R_2$, the respective zero error devices 106 and 106' operative with respective left manipulator control 26 and right manipulator control 22 cause the sequence control device 58 to open the relay devices 190 and 192.

The sequence control device 58 now closes the gate 86 and opens the gate 66 such that the center line control signal $S_{CL}$ from the center line distance storage device 68 is added to one half of the workpiece width signal $SW_f$ such that a control signal $SL_f$ is supplied through the OR device 70 to the left manipulator control 26. This same control signal $SL_f$ is supplied to the plus input of the difference device 72. The signal $SW_f$ is supplied by the output of the OR device 64 to the subtraction or minus input of the difference device 72 such that there is provided by the latter difference device 72 an output signal $SR_f$ which passes through the signal inverter 74 to the right manipulator control 22. The sequence control device 58 now operates the relay devices 190 and 192 to cause the motors 28 and 24 to move their respective manipulator members 20 and 18 into the positions $L_f$ for the left manipulator 20 and $R_f$ for the right manipulator member 18 such that the workpiece 16 is now positioned on the center line of the mill stand 10.

When the workpiece 16 reenters the mill stand 10, and assuming this is the final pass through the mill, the sequence control device is now operative such that the gate devices 62, 76 and 86 are closed. The gate device 88 is opened to provide a maximum width signal $SW_{max}$ from the maximum width storage device 90 which signal passes through the OR device 64. The gate device 66 is now opened by the sequence control device 58 such that this maximum width signal divided by 2 and added to the center line signal $S_{CL}$ is supplied as a signal $SL_{max}$ through the OR device 70 to the left manipulator control 26. This signal $SL_{max}$ from the OR device 70 is also applied to the plus input of the difference device 72. The control signal $SW_{max}$ is supplied to the minus input of the difference device 72 such that an output signal $SR_{max}$ equal to the signal $SL_{max}$ minus the signal $SW_{max}$ is supplied through the inverter device 74 to the right manipulator control 22. The sequence control device 58 now closes the relay devices 190 and 192 to cause the motor 28 to move the left manipulator member 20 to a position $L_{max}$ and the motor 24 to move the right manipulator member to a position $R_{max}$. These latter positions of the manipulator members are not shown in FIG. 4.

Figure 4A:
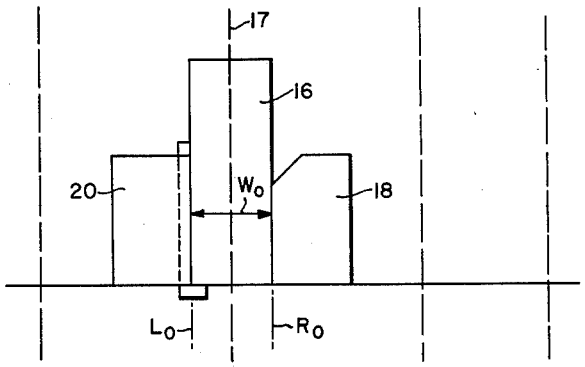
Figure 4B:
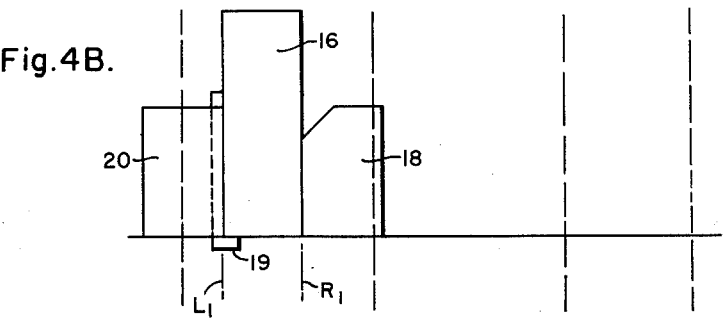
Figure 4C:
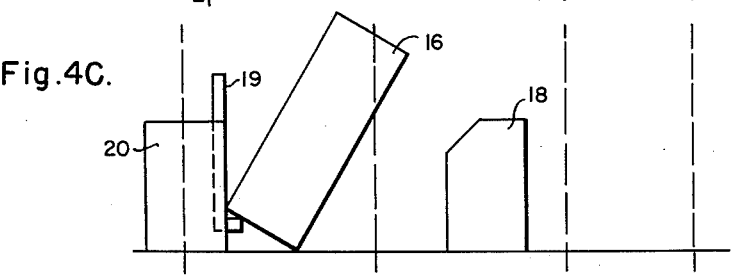
Figure 4D:
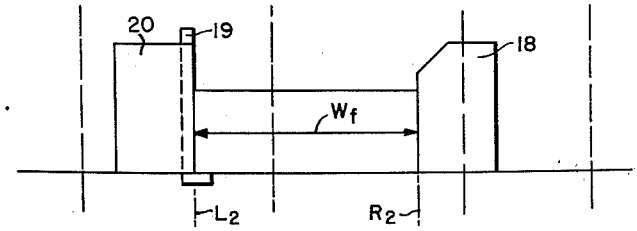
Figure 4E:
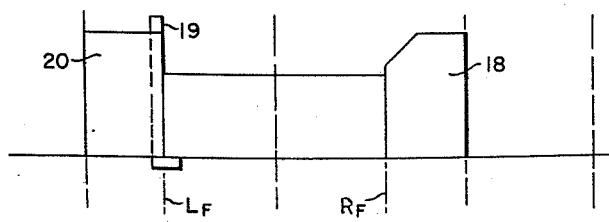

In FIGS. 4A through 4E, the sequenced relative positions of the left manipulator member 20 and the right manipulator member 18 are shown relative to the workpiece 16. The finger member 19 is shown carried by the left manipulator member 20. In FIG. 4A the workpiece 16 is shown in its initial position as it leaves the mill stand 10, with the position $L_0$ for the left manipulator 20 being shown and the right manipulator member 18 is shown in its position $R_0$. If it is necessary to move the workpiece 16 to the left to provide an adequate turning space on the work table, the left manipulator member 20 and the right manipulator member 18 can be moved to the respective positions $L_1$ and $R_1$ as shown in FIG. 4B. Then as shown in FIG. 4C, the right manipulator member 18 is moved in a direction toward its position $R_2$ and the finger members 19 are raised as the left manipulator member 20 begins its movement from its position $L_1$ towards its position $L_2$. It should be noted that the position $L_2$ substantially corresponds to the position $R_1$ for the right manipulator 18, and which latter position $R_1$ is also the pivot point for the turning of the workpiece 16. In FIG. 4D, the left manipulator member 20 is shown in its position $L_2$ and the right manipulator member 18 is shown in its position $R_2$, with the finger members 19 returned to the original position as shown in FIGS. 4A and 4B. In FIG. 4E, the left manipulator member 20 and the right manipulator member 18 have moved to their respective positions $L_f$ and $R_f$. The workpiece 16 is now positioned with its center axis corresponding to the center line 17 of mill stand 10.

In FIG. 5, there is illustrated the operation of the gate 66 for providing or effectively dividing each control signal received from the OR device 64 by two. It will be noted that the control signal, such as the initial width signal $SW_0$, received from the OR device 64 is in the form of a parallel binary digit signal, such that the digit corresponding to the 64 binary digit is connected to the 32 binary digit of the gate device 66 and the rest of the digits are likewise connected. The one binary digit of the signal from the OR device 64 is not connected to the gate device 66. The center line distance signal from the storage device 68 is connected to the 64 binary digit input of the gate device 66 such that the center line signal $S_{CL}$ which is arbitrarily chosen to be equal to 64 inches is prewired into the input of the gate device 66, and the width $SW_0$ signal received from the OR device 64 is divided by 2 and effectively added to this arbitrary center line signal $S_{CL}$. The width signal from the OR device 64 is directly connected to the difference device 72 as shown.

In FIG. 6, there is schematically illustrated one form of gate device which, for example, is shown as gate 62 connected between the width storage device 60 and the OR device 64. The gate device 62 is shown to include a plurality of AND devices with one input of each AND device coming from a respective digit of the binary parallel digit width signal received from the width storage device 60, and the second input of each AND device being connected to be energized from the sequence control device 58. Only when an output signal from the sequence control device is applied to one input of each of the end devices within the gate device 62 does the width signal from the width storage 60 pass through to the OR device 64.

In FIG. 7 there is a schematic showing of the OR device 70 which is seen to include an individual OR element or circuit receiving one input from the respective digits of each of the gate device 66, the gate device 76 and the gate device 86.

In FIG. 8, there is shown a suitable digital control system for each of the right and the left manipulator motors. In FIG. 8, the control system is shown for illustration as connected to the motor 28 and operative with the control signal received from the OR device 70. The output signal from the OR device 70 is supplied to the plus input of a digital difference device 100 within the left manipulator control 26. The minus input of the digital difference device 100 is energized from an analog digital converter 102 operative with the control motor 28 for the left manipulator member 20 such that a position error signal is supplied from the digital difference device 100 to a digital to analog converter 104 within the left manipulator control 26, which in turn is connected to control the operation of the motor 28 through the relay device 190. It should be noted that a zero error device 106 is shown connected to respond to the position error signal from the digital difference device 100 and provide an output signal to the sequence control device 58 when the error signal in the output of the digital difference device 100 is zero. Similarly, a binary signal sensing device 108 which can be made to respond to a parallel digital signal corresponding to a six inch position or some other predetermined position for the manipulator member 20 as may be desired and determined by the position error signal in the output of the digital difference device 100. This binary signal sensing device 108 also provides a control signal for the sequence control device 58 when this predetermined position condition is present.

In the operation of the control apparatus of the present invention, and during normal rolling operation when a workpiece is leaving the mill stand 10 and moving in a direction onto one of the end tables and between the left and right manipulator members, the gate 62 will be held open by the sequence control device 58 such that for example the initial width control signal $SW_0$ passes from the width storage device 60 through the gate device 62, the OR device 64 to the gate 66. At this time, the gate 66 is also held open by the sequence control device 58 such that the output signal from the gate device $SL_0$ equals the center line control signal $S_{CL}$ from the center distance storage device 68 plus the width control signal $SW_0$ divided by 2 due to the predetermined input wiring of the gate device 66. This control signal $SL_0$ is supplied to the left manipulator 26 and also is supplied to the plus input of the difference device 72. This control signal $SL_0$ specifies where the left manipulator 20 should be during what can be called normal rolling operation, such that, the manipulator members are positioned to receive a workpiece 16 having a width $W_0$ and coming from the mill stand 10. The control signal $SL_0$ positions the left manipulator 20 to an initial position $L_0$ as shown in FIG. 4A and which is substantially equal to the center line location plus the initial width control signal $SW_0$ divided by 2. The difference device is supplied with this same control signal $SW_0$ to its minus input such that a subtraction takes place to provide an output signal $SR_0$ which is equal to the control signal $SL_0$ minus the control signal $SW_0$. The latter output control signal $SR_0$ of the difference device 72 is then equal to the position that the right manipulator 18 should move to. The inverter device 74 is operative with the right manipulator control signal $SR_0$ to provide a signal inversion such that both of the left and right manipulator control devices 22 and 26 may be built substantially the same and it is in general, desirable to have their respective arbitrary zero reference point the same and beyond the right hand edge of the work table for both of them.

Thusly, during what can be considered normal rolling operation, the gate 62 and the gate device 66 will be open and all other gate devices will be closed by the sequence control device 58 such that the initial left manipulator control signal $SL_0$ is supplied to the left manipulator control 26. The control signal supplied to the right manipulator control 22 is the control signal $SR_0$ which provides a position for the right manipulator 18 which is substantially equal to the center line distance plus one half of the width $W_0$ of the workpiece 16 minus the full width $W_0$ of the workpiece 16 or, saying it in another way, the center line distance minus one half the width $W_0$ of the workpiece.

During normal rolling operation or rather initial rolling operation when the workpiece 16 is first received from the mill stand 10 for a turning operation, the two relay devices 190 and 192 shown in FIG. 3 will be normally opened because it is at this time not desired to operate the drive motors 28 and 24 which would cause the manipulator members to move during normal rolling. However, it should be understood that initially and prior to the receipt of the workpiece 16 from the mill stand 10, the respective motors 28 and 24 are operative to bring the respective manipulator members 20 and 18 to the appropriate positions $L_0$ and $R_0$ for receiving the workpiece from the mill stand, and then the relay devices 190 and 192 are opened to prevent further operation of the motors 28 and 24 until desired and as will be explained subsequently.

During the workpiece turning operation, there is a choice of operation which must be made and depends upon information that has been predetermined and punched into the control cards supplied to the card reader 50. This information is relative to whether or not there is adequate room on the work table to turn the workpiece 16. If there is adequate room to make a turn of the workpiece 16, with the left manipulator member in its position $L_0$, and relative to the center line 17 as shown in FIG. 4A the first turning positions of both manipulator members will be the same as they were for the initial rolling operation, namely the positions $L_0$ and $R_0$. However, a move to the left of the workpiece may be required if it has been predetermined by the mill operator that there will not be adequate room on the work table to complete a turn of the workpiece due primarily to the dimension $W_f$ of the workpiece 16. In general, a move to the left is required where the quantity.

$$\left(\frac{W_0}{2}+W_f\right)$$

is greater than the quantity (table width—safety factor), with the safety factor being in the order of 6 inches. For a large workpiece it would consequently extend beyond the edge of the table. In the latter instance, it is necessary to move both manipulator members to provide the desired room on the work table for the turn of the workpiece. This information that such a move is desirable is stored in the move to left storage device 78 and is supplied by the card reader device 50. When it comes time to turn the workpiece, whether or not there is sufficient room on the work table will be indicated by the presence or absence of the one value control signal stored in a move to left storage device 78. At the start of the turn of the workpiece 16, the signal stored in the move to left storage device 78 will be interrogated by opening the gate device 76 by the sequence control device 58. If there is a predetermined requirement to move the workpiece to the left to provide the desired turning room, a signal $SL_1$ from the move to the left storage device 78 will cause the left manipulator member 20 to move to the left, which signal passes through the gate device 76 and the OR device 70 to the left manipulator control 26. In this regard, it should be noted that the position $L_1$ may arbitrarily be always the same regardless of the size of the workpiece 16. On the other hand, the position $L_1$ may be varied as desired by suitable and different position control signals being punched into the respective control cards supplied to the card reader device 50.

For the purpose of illustration, it will be assumed that the position $L_1$ is in the order of 20 inches from the left edge of the work table. An illustrative mill for the purpose of example could be provided with a work table 90 inches wide and operative with the widest slab to be turned in the order of 78 inches at its longest dimension and having a thickness as great as 12 or 15 inches. Thusly, it may be necessary to move over near the left edge of the work table to provide the desired room for turning the larger workpieces.

Thusly, at the start of each turn of a workpiece, the present control apparatus automatically interrogates the output of the move to left storage device 78 to see if a move to the left should be made. This interrogation is accomplished by opening the gate device 76 by the sequence control device 58. If a turn is desired, the output signal from the move to left storage device 78 overrides any signal received from the gate device 66. This is accomplished by a prearranged wiring as well known to persons skilled in this art of the OR device 70 which includes a group of NOR circuits having a common bus connection wired in from digit to digit in such a way that when the signal $SL_1$ is supplied as a one value signal from the move to left storage device 78 supplied on a common bus, it forces a certain and predetermined parallel digit binary output signal from the gate device 70. This latter output signal $SL_1$ is supplied to the left manipulator control 26. Since the relay device 190 is normally open, the motor 28 is not operative by this signal. This same control signal $SL_1$ is supplied to the plus input of the difference device 72. The workpiece initial width signal $SW_0$ is still applied to the minus input of the difference device 72, such that the difference device 72 supplies through the inverter device 74 an output signal $SR_1$ to the right manipulator control 22. The sequence control device 58 can now close both of the relay devices 190 and 192 to move the respective manipulator members 20 and 18 to the left and into the positions $L_1$ and $R_1$, respectively.

It should be noted that when the gate device 76 is opened by the sequence control device 58 and an output signal from the move to left storage device 78 is provided in the output of the gate device 76, the inhibit device 80 which otherwise does not provide an output signal now is operative with the input of the gate device 66 to block the output of the gate device 66.

It should be further noted that in order to move the left manipulator member to a position corresponding to 20 inches from the left of the manipulator work table this can be accomplished by energizing only predetermined OR elements within the OR device 70. For example, to provide an $L_1$ position of 20 inches from the left edge of the work table, the position $L_1$ would correspond to the center line 17 position (which equals 64 inches) minus one-half of the table width $$\left(\frac{90}{2}=45 \text{ inches}\right)$$

plus 20 inches. In other words, $L_1=64-45+20=39$ inches. Thusly, each of following binary OR elements would have outputs, the binary 32 OR element, the binary 4 OR element, the binary 2 OR element and the binary 1 OR element. In this regard, it should be noted that the arbitrary example of a centerline distance of 64 inches with a 90 inch table causes the zero inch position to be 19 inches beyond the edge of a 90 inch table. Whatever combinations of signals are desired can be made up in this manner to provide the arbitrary position $L_1$ to which it is desired to move the left manipulator member when making a turn.

When the workpiece 16 leaves the mill stand 10, the sequence control device 58 is controlled by the exit hot metal detector 91 and the stop hot metal detector 93 shown in FIG. 1 and in FIG. 3. The sequence control device 58 is operative to open the gate device 76, and if no overriding move to left control signal $SL_1$ has been stored in the move to left storage device 78, the manipulator members will remain in their initial positions $L_0$ and $R_0$ with the workpiece on the center line of the mill stand 10.

The left manipulator member 20 moves to the left when a control signal $SL_1$ is provided and the right manipulator member 18 must follow along behind it in order to keep their separation equal to the initial workpiece width $W_0$.

Assume that the workpiece is now positioned in between the left and right manipulator members which are in their respective predetermined positions $L_1$ and $R_1$. This fact is detected by means of the zero error signals coming from each of the zero error devices 106 and 106' operative with the left manipulator control 26 and right manipulator control 22, as will be explained relative to the manipulator control diagrammatic showing in FIG. 8. The zero error signals cause the sequence control device 58 to cause the manipulators to advance to the post turn position shown in FIG. 4D. When the zero error signal causes the sequence control device 58 to advance to this next step in its operation, new information is supplied by the width storage device 60 for the next pass of the workpiece through the mill stand 10. The workpiece, when it is turned, will have the width $W_f$ for the next pass. It should be here noted that prior to the change of the new pass information and as soon as the control signal $SR_1$ was available in the output of the difference device 72, the gate device 84 was opened by the sequence control device 58 for a momentary time period to cause this right manipulator pre-turn position $R_1$ signal $SR_1$ to be stored in the pivot register 82. Since the gate device 86 remained closed at this time this information does not pass from the pivot register into the OR device 70. The pre-turn position $R_1$ is going to be the pivot point around which the axis of the workpiece 16 will rotate in making the turn, and it is necessary to store the position $R_1$ in the pivot register. Now the gate 84 is again closed by the sequence control device 58.

When both manipulator members are in their predetermined positions respectively $R_1$ and $L_1$, the new width control signal $SW_f$ is supplied by the width storage device 60 through the now open gate 62 to the OR device 64. The gate device 66 is closed. The gate device 86 is opened by the sequence control device 58, such that the control signal $SR_1$ stored in a pivot register 18 is now supplied to the left manipulator 26 as the control signal $SL_2$ for the left manipulator member 20. It should be here noted that the position $R_1$ of the right manipulator member 18 is substantially the same as the position $L_2$ of the left manipulator 20 and is also the pivot point for the workpiece 16. Since the relay device 190 is not closed by the sequence control device 58 at this time, the motor 28 does not operate.

This same signal which we shall now call $SL_2$ is applied to the plus input of the difference device 72 from the output of the OR device 70. The new width control signal $SW_f$ is available from the width storage device 60 through the open gate 62 and the OR device 64 to the minus input of the difference device 72 such that the difference device now provides an output signal $SR_2$ corresponding to the signal $SL_2$ minus the signal $SW_f$. The control signal $SR_2$ is applied through the inversion inverter device 74 to the right manipulator control 22. When the relay device 192 is now closed by the sequence control device 58, the motor 24 begins to move the right manipulator member 18 in a direction toward the position $R_2$. As soon as the right manipulator member 18 reaches a predetermined position in the order of 6 inches short of or before reaching the position $R_2$, the binary signal sensing device 108, operative with the right manipulator control device 22 and responsive to the output of the digital difference device 100' similar to the diagrammatic showing of FIG. 8, is operative to provide a control signal to the sequence control device 58 to cause the relay device 190 to now close to start the left manipulator motor 28 operating. Further, the sequence control device 58 now energizes the finger control system, not shown but well known to persons skilled in this art, for controlling the operation of the finger members 19 to start the finger members lifting such that the workpiece 16 is effectively turned about its pivot corner by the now raising finger members 19 and the now moving left manipulator member 20. The workpiece is caused to fall against the upper tapered corner of the right manipulator member 18 in that the workpiece 16 such as a steel mill billet member may weigh in the order of 15 tons or so and it is desired to break the fall of the workpiece 16 to avoid its full falling impact on the work table.

The actual control of the finger members 19 is not intended to be a part of the present invention but may readily be accomplished by a person skilled in this particular art by suitably providing information on the punched cards and applied to the card reader device 50 to state the movement distance desired by the finger members and further a suitable position limit switch operative with the finger members 19 may be provided to give a feedback signal terminating the motion of the finger members 19. The sequence control device 58 thusly tells the finger member control system when to start moving the finger members 19 and further can control the return of the finger members 19 to the position as shown in FIGS. 4A, 4B, 4D and 4E. For example, the finger members are caused to start moving at substantially the same time that the left manipulator relay 190 is closed, such that the manipulator member 20 begins moving from its position $L_1$ toward its position $L_2$ at substantially the same time that the finger members begin to rise thereby providing the desired arcuate movement of the workpiece about its pivot corner.

After the workpiece has been turned and is in the position shown in FIG. 4D, the gate device 86 is closed and the control signal $SL_2$ is no longer available from the pivot register 82. By now opening the gate device 66, the control apparatus is again operative in substantially the same manner as previously described when a workpiece was initially received from the mill stand. The width control signal $SW_f$ is supplied from the width storage device 60 through the gate device 62 and the OR device 64. The gate device 66 is operative to effectively add one half of the control signal $SW_f$ to the center line distance control signal $S_{cl}$ such that the OR device 70 supplies an output signal to the left manipulator control 26 which is equal to $$SL_f = S_{cl} + \frac{W_f}{2}$$

This control signal $SL_f$ is also supplied by the OR device 70 to the plus input of the difference device 72. The control signal $SW_f$ is supplied by the OR device 64 to the minus input of the difference device 72 such that the difference device effectively subtracts these signals to provide a control signal $SR_f$ equal to $SL_f - SW_f$. The control signal $SR_f$ passes through the inverter device 74 to the right manipulator control device 22. The sequence control device 58 now closes the relay devices 190 and 192 to cause the respective motors 28 and 24 to move their left manipulator member 20 and right manipulator member 18 to the respective positions $L_f$ and $R_f$ such that the workpiece 16 is now positioned as shown in FIG. 4E with its center line corresponding to the center line 17 of the mill stand 10.

For the purpose of further illustration, assume that it were desired to pass the workpiece through the mill stand 10 on its edge and then turn it down flat such that its greater dimension were parallel to the work table then pass it through the mill again and turn it back up on edge for passing through the mill a third time. The initial desired positions for the respective left manipulator member 20 and right manipulator member 18 would be the positions $L_0$ and $R_0$ shown in FIG. 4A. The workpiece, when it left the mill for example if it started from the front table 14 and passed onto the back table 12, would pass between the manipulator members in their respective positions $L_0$ and $R_0$. The turn can then be made as previously described and the manipulator members 20 and 18 move to their positions $L_f$ and $R_f$ as shown in FIG. 4E. The workpiece is now ready to again enter the mill for the second pass through the mill. As soon as the workpiece leaves the mill and moves onto the front table 14, it assumes a position between the manipulator members still in the position $L_f$ and $R_f$ respectively, but now called $L_0$ and $R_0$ for the second turn of the workpiece as shown in FIG. 4A. In this regard, it should be noted that the subscript 0 for the width signal $W_0$ and the subscript $f$ for the width signal $W_f$ have to do only with one particular turn of the workpiece. When the workpiece again moves onto the front table 14, the present control apparatus operates as though the width $W_0$ were actually a new dimension for a workpiece and as though it were presented for the first time.

If desired, the card reader can be designed to read through a complete rolling schedule that would include all the desired passes that were going to be made relative to a particular workpiece. Part of the information that could go onto the punched card in this regard are the dimensions of the workpiece. Further information could be punched relative to how many passes are to be made relative to a particular workpiece.

The operation of the maximum width storage device 90 is to prepare the control apparatus for receiving a new workpiece. In order to prepare the control apparatus for receiving a new workpiece, it is desirable to open the gate 88 and close the gate 62. This applies the maximum width control signal SW$_{max}$ from the storage device 90 through the gate 88 and the OR device 64 in a predetermined wiring pattern such that the OR device then supplies through gate 66 and OR 70 a predetermined position signal to the left manipulator control 26. Through the operation of the difference device 72 a suitable position signal is supplied to the right manipulator control 22 to effectively separate the left and right manipulator members by a predetermined maximum spacing, which for example could be in the order of 64 inches apart, or each 32 inches from the center line 17 of the mill. It should be understood that the latter dimensions are arbitrary and can be readily changed and varied as may be desired. It should be further noted that the manipulator members should not be separated too widely because the greater the separation between the manipulator members, the more time is required to move them between their full open and full closed positions.

When the workpiece leaves the mill stand and passes onto one of the tables, for example the back table 12, the exit hot metal detector 91 and the stop hot metal detector 93 shown in FIG. 1 and FIG. 3 are operative to cause the sequence control device 58 to be operative with the present control apparatus for turning the workpiece. The hot metal detectors indicate that a workpiece has left the mill stand 10 and further cause the workpiece to stop its movement on the back work table 12. When the workpiece is between the left and right manipulators, the gate 88 is closed and the gate 62 is opened to change the width signal that is applied to the present control apparatus. This latter signal SW$_0$ comes from the width storage device 60 and causes the manipulator members to move together. Both front and back manipulator members move in unison in that they are coupled together as shown in FIG. 1. When the manipulator members are in their respective positions L$_0$ and R$_0$, the control apparatus operates in the manner previously described.

The present application is related to a copending application Serial No. 818,454, filed June 5, 1959, by F. G. Willard and H. A. Pahl and assigned to the same assignee as is the present application. The latter application for example illustrates the prearranged wiring that can be made for the OR elements of the OR device 70.

Although the present invention has been described with a certain degree of particularity, it should be understood that the present disclosure has been made only by way of example and that numerous changes in the details of construction and the combination and arrangement of parts may be resorted to without departing from the scope and spirit of the present invention.

We claim as our invention:

1. In workpiece position control apparatus operative with first and second workpiece positioning members for positioning a workpiece, the combination of a first signal providing device for providing a predetermined position reference signal, a second signal providing device for providing a separation control signal for controlling the separation distance between said first and second workpiece positioning members, a first control device operatively connected to said first workpiece positioning member and responsive to at least said predetermined position reference signal and said separation control signal for providing a first position control signal for controlling the position of said first workpiece positioning member, and a second control device operatively connected to said second workpiece positioning member and responsive to at least said first position control signal and said separation control signal for providing a second position control signal for controlling the position of said second workpiece positioning member.

2. In workpiece position control apparatus operative with first and second workpiece positioning members for positioning a workpiece, the combination of a first signal providing device for providing a predetermined reference signal, a second signal providing device for providing a separation control signal in accordance with a first predetermined separation distance between said first and second workpiece positioning members, a first control device operatively connected to one of said first and second workpiece positioning members and responsive to said reference signal and said separation control signal for providing a first position control signal for positioning said one workpiece member in a first predetermined position in accordance with a predetermined combination of said reference signal and said separation control signal, and a second control device operatively connected to the other of said first and second workpiece members and responsive to said first positioning control signal and said separation control signal for providing a second position control signal for positioning said other positioning workpiece member in a second predetermined position and in accordance with a predetermined combination of said first position control signal and said sepaartion control signal.

3. In workpiece position control apparatus operative with first and second workpiece positioning members for controlling the position of a workpiece, the combination of a first signal providing device for providing a reference signal, a second signal providing device for providing a separation control signal for controlling the separation distance between said first and second workpiece positioning members, a first control device operative with said first workpiece positioning member and responsive to said reference signal and said separation control signal for providing a first output signal for controlling a first position of said first workpiece positioning member in accordance with a predetermined addition of said reference signal and said separation control signal, and a second control device operative with said second workpiece positioning member and responsive to said first output signal and said separation control signal for providing a second output signal for controlling a second position of said second workpiece positioning member in accordance with a predetermined difference between said first output signal and said separation control signal.

4. In workpiece position control apparatus operative with first and second workpiece positioning members for controlling the position of a workpiece, the combination of a first signal source for providing a reference signal in accordance with a reference position, a second signal source for providing a separation control signal in accordance with a predetermined separation distance between said first and second workpiece positioning members, a first control device operatively connected to said first workpiece member and responsive to said reference signal and said separation control signal for providing a first output signal for controlling the position of said first workpiece member relative to said reference position and in accordance with a predetermined combination of said reference signal and a predetermined portion of said separation control signal, and a second control device operatively connected to said second workpiece positioning member and responsive to said first output signal and said separation control signal for providing a second output signal for controlling the position of said second workpiece member relative to said reference position and in accordance with said first output signal minus said separation control signal.

5. In workpiece position control apparatus operative with first and second workpiece positioning members for controlling the position of a workpiece, the combination of a first signal supply device for providing a first position reference signal, a second signal supply device for supplying a separation control signal, a third signal supply device for providing a second position reference signal, first control means operative with one of said first and second workpiece positioning members and responsive to at least said first reference signal and said separation control signal for providing a first position control signal for controlling a first position of said one workpiece positioning member in accordance with a predetermined combination of a first reference signal and said separation control signal, second control means operative with the other of said first and second workpiece positioning members and responsive to at least said separation control signal and said first position control signal for controlling a first position of said other workpiece positioning member in accordance with a predetermined combination of said separation control signal and said first position control signal, and third control means operative with said one workpiece positioning member and responsive to said second positioning reference signal for controlling a second position of said one workpiece positioning member, with said second control means being responsive to said second position reference signal and said separation control signal for controlling a second position of the other workpiece positioning member.

6. In workpiece position control apparatus operative with first and second workpiece positioning members for controlling the position of a workpiece, the combination of, a first signal supply for providing a reference signal, a second signal supply for providing a separation control signal, first control means operative with said first workpiece positioning member and responsive to a predetermined combination of said reference signal and said separation control signal for providing a first output signal for controlling a first predetermined position of said first workpiece positioning member, second control means operative with said second workpiece positioning member and responsive to a predetermined combination of said separation control signal and said first position control signal for providing a second output signal for controlling a first predetermined position of said second workpiece positioning member, and a signal storage device for storing one of said first and second position control signals, with said first control means being subsequently operative with said signal storage device and responsive to said one position control signal for providing a third output signal for controlling a second predetermined position of said first workpiece positioning member, and with said second control means being subsequently responsive to a predetermined combination of said third output signal and said separation control signal for controlling a second predetermined position of said second workpiece positioning member.

7. In workpiece control apparatus operative with first and second workpiece positioning members for positioning a workpiece, the combination of a first signal source for providing a position reference signal, a second signal source for providing a first control signal in accordance with a first predetermined dimension of a workpiece, a third signal source for providing a second control signal in accordance with a second predetermined dimension of said workpiece, first position control means operative with said first workpiece positioning member and responsive to a predetermined combination of at least said reference signal and said first control signal for providing a first output signal for controlling an initial position of said first workpiece positioning member, second position control means operative with said second workpiece positioning member and responsive to at least said first output signal and said first control signal for providing a second output signal for controlling an initial position of said second workpiece positioning member in accordance with a predetermined position difference relationship between said first and second workpiece positioning members, and signal storage means operative with said second position control means for storing said second output signal, with said first control means being operative with said storage means and responsive to said stored second output signal for controlling a subsequent position of said first workpiece positioning member, and with said second control means being operative with said third signal source and responsive to said second control signal and said stored second output signal for controlling a subsequent position of said second workpiece positioning member in accordance with a second predetermined difference relationship between said first and second workpiece positioning members.

8. In workpiece control apparatus operative with first and second workpiece positioning members for positioning a workpiece, the combination of a first signal source for providing a predetermined position reference signal, a second signal source for providing a first position control signal in accordance with a first predetermined dimension of said workpiece, a third signal source for providing a second position control signal in accordance with a second predetermined dimension of said workpiece, signal combining means operative with said first workpiece positioning member and responsive to said reference signal and said first position control signal for providing a first output signal for controlling a first position of said first workpiece positioning member, a position difference determining device operative with said second workpiece positioning member and responsive to at least said first output signal and said first position control signal for providing a second output signal for controlling the position of said second workpiece positioning member in accordance with a first predetermined position difference relationship between the first and second workpiece positioning members, signal storage means operative with said difference determining device for storing said second output signal, and control means operative with said first workpiece positioning member and responsive to the stored second output signal for controlling a second position of said first workpiece position member in accordance with said second output signal, with said position difference determining device being operative with said third signal source and responsive to said second position control signal for controlling a second position of said second workpiece positioning member in accordance with a second predetermined position difference relationship between the first and second workpiece positioning members.

9. In workpiece position control apparatus operative with first and second workpiece positioning members for positioning a workpiece, the combination of a first signal providing device for providing a predetermined position reference signal, a second signal providing device for providing a separation control signal for controlling the separation distance between said first and second workpiece positioning members, a first control device operatively connected to said first workpiece positioning member and responsive to a predetermined combination of said reference signal and said separation control signal for providing a first position control signal for controlling the position of said first workpiece positioning member, and a second control device operatively connected to said second workpiece positioning member and responsive to a predetermined combination of said first position control signal and said separation control signal for providing a second position control signal for controlling the position of said second workpiece positioning member.

10. In workpiece position control apparatus operative with first and second workpiece positioning members for positioning a workpiece, the combination of a first signal providing device for providing a predetermined position reference signal, a second signal providing device for providing a separation control signal in accordance with a first predetermined separation distance between said first and second workpiece positioning members, a first control device operatively connected to one of said first and second workpiece positioning members and responsive to said reference signal and said separation control signal for providing a first position control signal for positioning said one workpiece member in a first predetermined position in accordance with a predetermined addition of said reference signal and said separation control signal, and a second control device operatively connected to the other of said first and second workpiece members and responsive to said first position control signal and said separation control signal for providing a second position control signal for positioning said other positioning workpiece member in a second predetermined position and in accordance with a predetermined difference of said first position control signal and said separation control signal.

11. In workpiece position control apparatus operative with first and second workpiece positioning members for controlling the position of a workpiece, the combination of a first signal providing device for providing a position reference signal in accordance with a predetermined reference position, a second signal providing device for providing a separation control signal for controlling the separation distance between at least one of said first and second workpiece positioning members and said reference position, a first control device operative with said first workpiece positioning member and responsive to said reference signal and said separation control signal for providing a first output signal for controlling a first position of said first workpiece positioning member in accordance with a first predetermined relationship to said reference position, a second control device operatively connected to said second workpiece positioning members and responsive to said first output signal and said separation control signal for providing a second output signal for controlling a second position of said second workpiece positioning member in accordance with a second predetermined relationship to said reference position.

12. In workpiece position control apparatus operative with first and second workpiece positioning members for controlling the position of a workpiece, the combination of a first signal source for providing a reference signal, a second signal source for providing a separation control signal in accordance with a predetermined separation distance between said first and second workpiece positioning member and responsive to said first output connected to said first workpiece member and responsive to said reference signal and said separation control signal for providing a first output signal for controlling the position of said first workpiece member in accordance with a predetermined combination of said reference signal and one half of said separation control signal, and a second control device operatively connected to said second workpiece positioning member and responsive to said first output signal and said separation control signal for providing a second output signal for controlling the position of said second workpiece member in accordance with said first output signal minus said separation control signal.

13. In workpiece position control apparatus operative with first and second workpiece positioning members for controlling the position of a workpiece, the combination of a first signal supply device for providing a first position reference signal, a second signal supply device for supplying a separation control signal, a third signal supply device for providing a second position reference signal, first control means operative with said first workpiece positioning member and responsive to at least said first reference signal and said separation control signal for providing a first position control signal for controlling a first position of said first workpiece positioning member, second control means operative with said second workpiece positioning member and responsive to at least said separation control signal and said first position control signal for controlling a first position of said second workpiece positioning member, and third control means operative with said first workpiece positioning member and responsive to said second positioning reference signal for controlling a second position of said first workpiece positioning member, with said second control means being responsive to said second position reference signal and said separation control signal for controlling a second position of the second workpiece positioning member.

14. In workpiece position control apparatus operative with first and second workpiece positioning members for controlling the position of a workpiece, the combination of a first signal supply for providing a position reference signal, a second signal supply for providing a separation control signal, first control means operative with said first workpiece positioning member and responsive to said reference signal and said separation control signal for providing a first output signal for controlling a first predetermined position of said first workpiece positioning member, second control means operative with said second workpiece positioning member and responsive to said separation control signal and said first position control signal for providing a second output signal for controlling a first predetermined position of said second workpiece positioning member, and a signal storage device for storing said second position control signal, with said first control means being subsequently operative with said signal storage device and responsive to said second position control signal for providing a third output signal for controlling a second predetermined position of said first workpiece positioning member, and with said second control means being subsequently responsive to said third output signal and said separation control signal for controlling a second predetermined position of said second workpiece positioning member.

15. In workpiece control apparatus operative with first and second workpiece positioning members for positioning a workpiece, the combination of a first signal source for providing a position reference signal, a second signal source for providing a first position control signal in accordance with a first dimension of a workpiece, a third signal source for providing a second position control signal in accordance with a second dimension of said workpiece, first position control means operative with said first workpiece positioning member and responsive to at least said reference signal and said first position control signal for providing a first output signal for controlling an initial position of said first workpiece positioning member, second position control means operative with said second workpiece positioning member and responsive to said first output signal and said first position control signal for providing a second output signal for controlling an initial position of said second workpiece positioning member in accordance with a predetermined position difference relationship in the order of said first workpiece dimension being present between said first and second workpiece positioning members, and signal storage means operative with said second position control means for storing said second output signal, with said first control means being operative with said storage means and responsive to said stored second output signal for controlling a subsequent position of said first workpiece positioning member, and with said second control means being operative with said third signal source and responsive to said second position control signal and said stored second output signal for controlling a subsequent position of said second workpiece positioning member in accordance with a second predetermined difference relationship in the order of said second workpiece dimension being present between said first and second workpiece positioning members.

References Cited in the file of this patent

UNITED STATES PATENTS

| | | |
|---|---|---|
| 2,363,208 | Sulzer | Nov. 21, 1944 |
| 2,484,968 | Sponaugle | Oct. 18, 1949 |
| 2,710,934 | Senn | June 14, 1955 |
| 2,736,852 | Nelson | Feb. 28, 1956 |
| 2,741,732 | Cunningham | Apr. 10, 1956 |